United States Patent Office 3,514,298
Patented May 26, 1970

3,514,298
SPRAY DRYING A FAT-CARBOHYDRATE COMPOSITION
Peter P. Noznick, Evanston, and Charles W. Tatter, Homewood, Ill., assignors to Beatrice Foods Co., Chicago, Ill., a corporation of Delaware
No Drawing. Continuation-in-part of application Ser. No. 356,058, Mar. 31, 1964. This application Mar. 29, 1968, Ser. No. 717,370
Int. Cl. A23d 5/04
U.S. Cl. 99—123                                7 Claims

ABSTRACT OF THE DISCLOSURE

Stable aqueous emulsions of a carbohydrate and fat containing large amounts of fat are obtained by employing a partial ester of a higher fatty acid and a polyglycerol even without the use of a protein. A small amount of protein, up to 2%, can be included. There can also be employed a colloidal carbohydrate stabilizer in amount up to 5%. The products can be spray dried.

---

This application is a continuation-in-part of application Ser. No. 356,058, filed Mar. 31, 1964 and now abandoned.

The present invention relates to emulsified mixtures of fats and carbohydrates containing substantial amounts of fats when little or no protein is present.

It is normally difficult to make stable emulsions of sugars such as sucrose and dextrose containing syrups, e.g. corn syrup, with fats, particularly liquid fats in water. Thus the Schoch patent, Ser. No. 2,876,160, shows that corn syrups with a D.E. value of 30 and above are unsatisfactory as dispersing agents for oils. The file history of the Schoch patent further shows that corn syrups with a D.E. value as low as 24 are unsatisfactory for making dispersed products. This is true even though Schoch can add a surface active agent as an emulsifier to his formulations.

It is an object of the present invention to prepare novel stable aqueous emulsions of fats and carbohydrates.

Another object is to prepare stable aqueous emulsions of fats with corn syrups having a D.E. value of 24 to 80.

An additional object is to prepare stable aqueous emulsions of fats with sucrose containing formulations.

A further object is to prepare dry powders from aqueous emulsions of fats with carbohydrates, preferably corn syrups having D.E. values of 30 or above and/or sucrose.

Yet another object is to prepare such emulsions and dry powders without the use of protective colloids.

Another object is to spray dry mixtures of fats and corn syrup and/or sucrose having unusually high amounts of sugar.

A still further object is to prepare spray dried mixtures of fats and carbohydrates having high amounts of fat.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing polyglycerol esters of fatty acids as the emulsifying agents. While polyglycerol esters from diglycerol to triconto (30 glycerol units) glycerol esters of fatty acids can be employed there are preferably employed triglycerol to decaglycerol esters of higher fatty acids, (e.g. containing 12 to 22 carbon atoms in the fatty acid). The most suitable polyglycerol esters are partial esters, i.e. they have one or more free hydroxyl groups and hence have both hydrophilic and liophilic characteristics.

Examples of suitable polyglycerol esters are triglycerol monostearate, triglycerol monoshortening (triglycerol mono ester of the acids of cottonseed oil), triglycerol monooleate, hexaglycerol monostearate, hexaglycerol monoshortening, hexaglycerol monooelate, hexaglycerol dioleate, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol tri shortening, decaglycerol trioleate, decaglycerol trilinoleate, decaglycerol decastearate, decaglycerol decaoleate, decaglycerol deca linoleate, decaglycerol tetraoleate, diglycerol monostearate, dodecaglycerol hexapalmitate, decaglycerol tripalmitate, decaglycerol di arachinate, triglycerol mono behenate, dodecaglycerol tri lignocerate, decaglycerol mono linolenate, hexaglycerol di ricinoleate, decaglycerol deca myristate, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

The polyglycerol esters are useful in giving stable emulsions and uniform, non-sticky spray dried proudcts in three groups of products in which the essential materials are:

(I) fat, carbohydrate and polyglycerol ester
(II) fat, carbohydrate, colloidal stabilizer and polyglycerol ester
(III) fat, carbohydrate, polyglycerol ester and protein in an amount not over 2%, e.g. 0.5 to 2%.

The term fat as used in the present specification and claims includes both liquid and solid fats. Among the suitable edible fats which can be used are cottonseed oil, safflower oil, corn oil, soybean oil, butterfat, coconut oil, peanut oil, lard, hydrogenated cottonseed oil, hydrogenated corn oil, hydrogenated soybean oil, hydrogenated peanut oil, olive oil, hydrogenated olive oil, hydrogenated coconut oil, e.g. hydrogenated to a melting point of 92° F.

The polyglycerol ester is used in the compositions of the present invention in an amount of 0.5–30% (preferably about 2 to 3% of the fat. In some instances it is desirable to use up to 10% of the polyglycerol ester based on the fat.

Unless otherwise indicated, all parts and percentages in the present specification and claims are by weight.

As the carbohydrate there can be used corn syrups with D.E. values of 4 to 70 or higher, molasses, maltose, ribose, galactose, xylose, arabinose, honey, lactose, sucrose, dextrin, water soluble starch, pregelatinized starch, gum arabic, larch gum arabinogalactan (Stractan), d-glucose, modified starches of the types set forth in Schoch Pat. No. 2,876,160, e.g. hypochlorite-oxidized cornstarch, torrefaction or roasted dextrins, e.g. canary dextrins, yellow dextrins and British gums having a solubility in cold water of at least 80%, thin boiling oxidized starches, e.g. those having a Scott hot paste viscosity of about 45 to 90, etherified starches including hydroxyethyl, hydroxypropyl, methyl and ethyl derivatives having a degree of substitution of 0.04 to 0.25 ether group per glucose unit as well as acid or oxidation modified etherized starches, starch esters, e.g. starch acetate and starch sulfonate, waxy maize starch, waxy sorghum starch, hydroxyethyl torrefaction dextrin, converted starches having a D.E. value of 4 to 20.

The invention is of particular value in forming stable emulsions and spray dried products from mixtures of fats with converted starches or sugars that cannot be employed in Schoch. Such converted starches include corn syrups having D.E. values of 24 to 70 (e.g. 42) and higher. Thus there can be spray dried emulsions containing 20 to 80% fat with 80 to 20% of d-glucose and/or sucrose with lactose, e.g. where lactose is 20 to 50% of the total of glucose and/or sucrose and lactose by using the polyglycerol esters as emulsifying agents.

The fat is normally 20 to 75% based on the total of fat and carbohydrate but can be as high as 85%. It is surprising that such high amounts of fat can be emulsified and spray dried with carbohydrates even though protein is absent or present in an amount not over 2%.

Harris Pat. No. 2,024,351 or, page 2, column 2, lines 57–63 shows a formulation containing 52 parts cocoa powder out of 300 parts of material.

While corn syrup having a D.E. value of 15 to 60 or 70 is commonly used as the carbohydrate, there can be employed syrups of the same D.E. value prepared from tapioca, wheat, rice, sorghum, sago potato, arrowroot, waxy maize or waxy sorghum starches or mixtures of these converted starches with each other or corn syrups.

It has been found that surprisingly very stable aqueous emulsions are prepared from the mixture of fat and corn syrups of D.E. values 24 and above and the sugars, even without using colloidal carbohydrates or proteins. Surprisingly, it is also possible to spray dry such compositions in the absence of colloidal carbohydrates and proteins. Thus good results have been obtained in spray drying mixtures of 50% of sugar or corn syrup, D.E. value 42, and 50% cotton oil.

In order to obtain the best spray dried compositions containing large amounts, e.g. 50% or more of difficulty driable carbohydrates such as products containing large amounts of sucrose or dextrose or corn syrups of D.E. value 24 and above, based on the total of carbohydrate and fat, it is frequently desirable to add in addition to the polyglycerol ester 0.05–5%, preferably 0.2–2%, of a colloidal carbohydrate stabilizer based on the dry weight of the composition.

Such colloidal carbohydrate stabilizers include cellulose ethers such as methyl cellulose, e.g. Methocel MC (dimethyl ether of cellulose having 1.64–1.92 methoxy groups per glucose unit), mixed methyl hydropropyl cellulose, e.g. Methocel 90 HG (an etherified cellulose having 1.08–1.42 methoxy groups and 0.1–0.3 hydroxypropyl groups per glucose unit) and Methocel 65 HG (an etherified cellulose having 1.61–1.75 methoxy groups and 0.1–0.18 hydroxypropyl groups per glucose unit), carboxymethyl cellulose, low methoxy pectin, i.e., pectin having a methoxy content of 2.5–4.5%, inulin, guar, Irish moss (carragheen), sodium alginate, gum tragacanth, gum karaya and locut bean gum.

In preparing the emulsions the water is generally 40 to 95% and the solids 60 to 5% although the solids can be as low as 2%.

The mixtures are pasteurized in conventional fashion, e.g. at 140–165° F. for 40–20 minutes, usually 155–160° F. for 30 minutes. The pasteurization conditions are not critical. Conveniently pasteurization is carried out at above the melting point of the fat.

The emulsions are homogenized in conventional fashion to a particle size between 1 to 10 microns. For many uses the particle size of the emulsified material is not over 5 microns although in preparing whipping products the particle size is usually somewhat larger, e.g. 3 to 8 microns.

Homogenization is carried out in conventional fashion at about the pasteurization temperature at pressures which can vary from 100 p.s.i. to 2,000 p.s.i. or somewhat higher. Preferably the homogenization pressure is not over 2,500 p.s.i. and in the examples unless otherwise indicated was 1,500 p.s.i.

The emulsified, homogenized products are spray dried in commercial apparatus to give a particle size of 50 to 200 microns.

It has been found that when gum arabic is the carbohydrate it is possible to have up to 75 or 85% fat based on the total of fat and carbohydrate whereas when dextrins are the carbohydrate, the percent fat can be up to 65–70% or even up to 85%. With corn syrups D.E. value of 42 there can be used up to 60% or higher fat with 40% or lower of the corn syrups.

The polyglycerol esters of the present invention aid the carbohydrate gums in entrapping fat better than the gums alone.

The compositions of the present invention are useful as shortening compositions, whipping compositions, clouds, etc.

EXAMPLE 1

A mixture of 50% cottonseed oil, 48.5% of corn syrup 42 D.E. and 1.5% of decaglycerol monostearate were pasteurized at 155–160° F. for 30 minutes and homogenized in water at 35% total solids. The product then was spray dried. It was found that a good coating of the corn syrups on the oil was obtained. This was surprising since normally the cottonseed oil is tough to coat properly.

EXAMPLE 2

Stable homogenized and emulsified mixtures were made from each of the following compositions in water.

|  | (a) | (b) | (c) | (d) | (e) |
| --- | --- | --- | --- | --- | --- |
| Decaglycerol tristearate | 1.5 | 1.5 | 1.5 | 1.5 | 1.5 |
| Cottonseed oil | 20 | 25 | 30 | 40 | 50 |
| Corn syrups 42 D.E. | 78.5 | 73.5 | 68.5 | 58.5 | 48.5 |

In each case water was added to give 35% solids. The mixutres were then spray dried at a particle size of about 125 microns.

In place of the 42 D.E. corn syrups in Examples 2(a), 2(b), 2(c), 2(d) and 2(e), there were also used corn syrups of 15 D.E. and 70 D.E. to successfully obtain spray dried products.

EXAMPLE 3

| | Parts |
| --- | --- |
| Corn syrup solids 37 D.E. | 71.5 |
| Corn oil | 26.5 |
| Decaglycerol tristearate | 0.5 |
| Methocel MC (25 cps. grade) | 0.5 |

Water sufficient to make 35% total solids.

The corn syrup solids and water were heated to 140° F. and the decaglycerol tristearate and Methocel dispersed in the corn oil were added. The mixture was stirred for 10–15 minutes and then at a temperature of 130–135° F. the mixture was homogenized in two stages, the pressure in the first stage was 2000 p.s.i. and in the second stage 500 p.s.i. The homogenized product was spray dried to give a non-tacky product. The product was useful in products where protein is not desired, e.g. in a dietetic food product. It also was useful in reconstituted foods such as clouds.

EXAMPLE 4

| | Parts |
| --- | --- |
| Butterfat | 58.75 |
| Decaglycerol decastearate | 1.25 |
| Frodex 24 (corn syrup solid 24 D.E.) | 39.5 |
| Sodium caseinate | 0.5 |

The sodium caseinate was added to give more coating to the material encasing the fat but it can be eliminated.

The above mixture was emulsified, pasteurized and homogenized in water at 35% total solids and spray dried to give a dry non-tacky product which was suitable for use where a butter flavor is desired. Thus in one case it was sprinkled over popcorn.

When using a mixture of (a) sugar, (b) fat and (c) the polyglycerol ester emulsifier, it has been found preferable to use decaglycerol monoesters such as decaglycerol monostearate. With more complex systems wherein dextrin or gum arabic is employed to replace all or part of the sugar, then polyglycerol esters having intermediate functionality (hydrophilic-lipophilic characteristics) such as decaglycerol decastearate and decaglycerol hexastearate are preferred. If a more hydrophilic emulsifier is desired then there is used a material such a decaglycerol tristearate.

It has been found, as a rule, that the use of higher polyglycerol esters, e.g. decaglycerol decastearate, gives superior dry powders to those obtained with lower polyglycerol esters, e.g. triglycerol monostearate, although the latter can be employed to give operative results.

EXAMPLE 5

A mixture of 50 parts hydrogenated cottonseed oil, 50 parts corn syrups 65 D.E. emulsified with 2 parts of decaglycerol hexastearate at 50% solids was emulsified in water, pasteurized at 155° F. for 30 minutes, homogenized at 500 p.s.i. and spray dried to give a good dry product.

EXAMPLE 6

| | Parts |
|---|---|
| Drew Cobee 110 (a hard fat which is a combination of hydrogenated cottonseed oil and coconut oil M.P. 110–114, Iodine Value 0.2 max.) | 19.5 |
| Decaglycerol tristearate | 0.5 |
| Gum acacia (dry) | 65.0 |
| Cane sugar | 15.0 |

This mixture was made up in water to 35%, emulsified, pasteurized and spray dried to form a clouding agent.

EXAMPLE 7

| | Parts |
|---|---|
| Corn syrup solids 37 D.E. | 71.5 |
| Butterfat | 26.5 |
| Decaglycerol tristearate (emulsifier) | 0.5 |
| Methocel MC (100 cps. grade) | 0.5 |

The corn syrups solids and water were heated to 140° F. Then there were separately added the butterfat, emulsifier and Methocel to give an emulsion containing 55% solids. The mixture was held at 140–145° F. for 20 minutes, homogenized at 1000–1500 p.s.i. and spray dried to give a product suitable as a popcorn coating. The product homogenized and spray dried very easily.

EXAMPLE 8

| | Parts |
|---|---|
| Butterfat | 35.0 |
| Decaglycerol tristearate | 0.5 |
| Frodex 15 (corn syrup 15 D.E.) | 63.0 |
| Methocel MC (100 cps. grade) | 0.5 |

The procedure of Example 7 was repeated using a homogenization pressure of 1500 p.s.i. The product dried even better than that of Example 7. While Methocel was used as a drying aid in Examples 7 and 8, it can be eliminated in either of these examples and a good spray dried product is still obtained.

In whipping up the spray dried product ½ cup of whole milk, skim milk or water is placed in a "Mixmaster" or other electric mixing machine bowl and 57 grams (2 ounces) of the dry powder are stirred slowly into the liquid in the bowl until thoroughly mixed. The mixing device is operated at high speed until the desired whipped body is reached, usually 2 to 4 minutes. A hand whipping device can also be employed.

In combining the powder with water to make a whippable mix, there can be used from 45 to 85% water with 55 to 15% powder, preferably 35% powder and 65% water.

This powder is a very excellent whipping material of good keeping qualities and useful to form a whippable body in many food products, including custards, ice cream, puddings, toppings, fillings and icings, etc., and also can be used as an instant ice cream base.

EXAMPLE 9

| | Parts | | |
|---|---|---|---|
| | (a) | (b) | (c) |
| Hydrogenated cottonseed oil | 49.0 | 71.0 | |
| Decaglycerol decastearate | 1.0 | 2.0 | 1.0 |
| Dextrin | 50.0 | | |
| Sodium caseinate | | 2.0 | 0.5 |
| Frodex 15 (corn syrups 15 D.E.) | | 24.0 | 49.5 |
| Unsalted butterfat | | | 49.0 |

Example 9(a) was a formulation extremely high in fat with no protein or carbohydrate gum. Example 9(b) was a formulation very extremely high in fat with little protein. Example 9(c) was a formulation extremely high in butterfat using as little casein as possible. All of these formulations using conventional emulsifiers in place of the polyglycerol ester could not be homogenized and spray dried satisfactorily. However, using the decaglycerol decastearate each of Examples 9(a), 9(b) and 9(c) was readily homogenized in water at 35% solids content (and also at 55% solids content) and each of the homogenized aqueous emulsion was readily spray dried for use by a customer.

EXAMPLE 10

A mixture of 50 parts lactose, 48.5 parts hydrogenated cottonseed oil and 1.5 parts of decaglycerol tristearate was homogenized at 55% solids in water and readily spray dried. The addition of 0.2 parts of Methocel MC as a drying aid made an even more readily spray driable formulation. Similarly Methocel HG was a suitable drying aid.

EXAMPLE 11

| | Parts |
|---|---|
| Hydrogenated cottonseed oil | 30 |
| Cane sugar | 50 |
| Lactose | 17 |
| Methocel MC (15 cps. grade) | 1 |
| Decaglycerol tristearate | 3 |

This mixture was homogenized and pasteurized at 150° F. and 55% solids in water and then was spray dried. It was surprising that a satisfactory spray dried product could be produced with such a large amount of cane sugar in the formulation.

EXAMPLE 12

| | Parts |
|---|---|
| Cane sugar | 40 |
| Lactose | 27 |
| Decaglycerol tetraoleate | 1 |
| Cottonseed oil | 29 |
| Methocel (15 cps. grade) | 2 |

This mixture was homogenized and pasteurized at 55% solids in water and successfully spray dried.

EXAMPLE 13

| | (a) | (b) |
|---|---|---|
| Chicken fat, parts | 50.0 | 50.0 |
| Decaglycerol decastearate, part | 1.0 | 1.0 |
| Dextrin, parts | 48.0 | 47.5 |
| Sodium caseinate, part | | 0.5 |

Both formulations, 13(a) and 13(b), were made up as 35% total solids in water, pasteurized and homogenized at 1500 p.s.i. and spray dried with a 69/20 nozzle.

EXAMPLE 14

| | Kilograms |
|---|---|
| Liquid cottonseed oil | 1.17 |
| Decaglycerol tristearate | 0.05 |
| Lactose | 5.05 |

This formulation was pasteurized and homogenized in 2.9 gallons of water. A good emulsion was obtained. The product was spray dried to give a good powder.

EXAMPLE 15

|  | (a) | (b) |
|---|---|---|
| Liquid cottonseed oil, kilograms | 2.34 | 2.925 |
| Decaglycerol tristearate, kilograms | 0.06 | 0.075 |
| Lactose, kilograms | 3.80 | 3.20 |
| Water, gallons | 2.9 | 2.8 |

Good homogenized emulsions were obtained in both Examples 15(a) and 15(b). After spray drying a very good product was obtained.

When the emulsifier was omitted from Examples 14 and 15(a) and (b), no emulsion was obtained and it was difficult to spray dry the product. When mono and diglycerides were substituted for the polyglycerol esters in Examples 14 and 15(a) and (b) only a fair emulsion was obtained. When Tween (oxyethylated sorbitan oleate) was employed in place of the polyglycerol esters only a weak emulsion was obtained after homogenizing and upon spray drying the product was a greasy wet mass.

EXAMPLE 16

Liquid cottonseed oil—2.925 kilograms
Decaglycerol tristearate—0.075 kilogram
Sweetose (62 D.E. corn syrups solids)—3.76 kilograms
Water—2.7 gallons The homogenized and pasteurized product gave a very good stable emulsion. The product dried to a white powder which was somewhat tacky.

EXAMPLE 17

| | Parts |
|---|---|
| White Crest | 39.0 |
| Decaglycerol tristearate | 1.0 |
| Cane sugar | 40.0 |
| Frodex 15 | 17.4 |
| Methocel (90 HG) | 3.0 |

This mixture was pasteurized and homogenized at 35% total solids in water to give an excellent emulsion which was stable and was spray dried to give a good powder.

A good emulsion was also obtained by omitting the Methocel.

EXAMPLE 18

| | Parts |
|---|---|
| Hydrogenated cottonseed oil | 39.0 |
| Decaglycerol monostearate | 1.0 |
| Cane sugar | 40.0 |
| Frodex 15 | 17.0 |
| Carboxymethyl cellulose | 3.0 |

The product was homogenized in water at 35% solids and spray dried to a good powder.

EXAMPLE 19

| | Parts |
|---|---|
| Methocel (MC type 15 cps. grade) | 70 |
| Decaglycerol tristearate | 1 |
| Cottonseed oil | 29 |

This was emulsified and homogenized at 5% solids and then spray dried.

EXAMPLE 20

| | Parts |
|---|---|
| Hydrogenated cotton seed oil | 78 |
| Decaglycerol decastearate | 2 |
| Sodium caseinate | 2 |
| Frodex 15 (maltodextrin, 15 D.E.) | 18 |

The composition was readily homogenized in water at 35% solids and the homogenized aqueous emulsion was readily spray dried.

Similarly the composition was readily homogenized at 55% solids in water to form an emulsion which was spray dried. This composition contained over 81% fat based on the fat and carbohydrate. It was most surprising that such a composition could be emulsified and then satisfactorily spray dried.

As used in the claims unless otherwise indicated the term "dextrin" includes not only materials which are completely dextrinized but also materials which are a mixture of glucose and/or maltose and dextrin such as corn syrups having a D.E. value of at least 4.

The term "up to" in the claims is intended to include zero.

What is claimed is:

1. A process for spray drying mixtures of fats and carbohydrates comprising forming a composition consisting of an aqueous emulsion of (1) a polyglycerol partial ester of a higher fatty acid, (2) a carbohydrate selected from the group consisting of water soluble starch, modified starch, dextrin, sucrose, glucose, maltose, lactose and gum arabic and (3) a fat, the polyglycerol partial ester being 0.5 to 30% of the fat and spray drying said composition.

2. A process according to claim 1 wherein the polyglycerol partial ester is 0.5 to 10% of the fat.

3. A process according to claim 2 wherein the polyglycerol partial ester is 2 to 3% of the fat.

4. A process according to claim 3 wherein the fat is 40 to 75% of the total of the fat and carbohydrate.

5. A process according to claim 2 wherein the fat is 20 to 50% of the total of fat and carbohydrate.

6. A process according to claim 1 wherein the composition consists essentially of fat, dextrin and polyglycerol partial ester and said partial ester is 0.5 to 10% of the fat.

7. A process according to claim 6 wherein the fat is 20 to 50% of the total of fat and dextrin.

References Cited

UNITED STATES PATENTS

| | | | |
|---|---|---|---|
| 2,024,356 | 12/1935 | Harris | 99—123 X |
| 2,694,643 | 11/1954 | Robinson et al. | 99—141 X |
| 2,913,342 | 11/1959 | Cameron et al. | 99—123 |
| 3,098,748 | 7/1963 | Noznick et al. | 99—123 X |
| 3,295,986 | 1/1967 | Saslaw et al. | 99—123 |

OTHER REFERENCES

Nash, Nat. H., Bakers Digest, October 1963, pp. 72–75.
Journal of Biological Chemistry, 71, pp. 15–31, 1926.

MAURICE W. GREENSTEIN, Primary Examiner

U.S. Cl. X.R.

99—139, 199